United States Patent
Jeong

(10) Patent No.: US 10,251,486 B2
(45) Date of Patent: Apr. 9, 2019

(54) HEADREST MOVING DEVICE

(71) Applicant: WOOBO TECH CO., LTD., Pyeongtaek-si, Gyeonggi-do (KR)

(72) Inventor: Hae Il Jeong, Incheon (KR)

(73) Assignee: WOOBO TECH CO., LTD., Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/550,834

(22) PCT Filed: Feb. 26, 2016

(86) PCT No.: PCT/KR2016/001937
§ 371 (c)(1),
(2) Date: Aug. 14, 2017

(87) PCT Pub. No.: WO2016/144029
PCT Pub. Date: Sep. 15, 2016

(65) Prior Publication Data
US 2018/0042383 A1   Feb. 15, 2018

(30) Foreign Application Priority Data
Mar. 10, 2015   (KR) .................. 10-2015-0033262

(51) Int. Cl.
A47C 7/38 (2006.01)
B60N 2/838 (2018.01)
B60N 2/80 (2018.01)
B60N 2/847 (2018.01)

(52) U.S. Cl.
CPC .............. *A47C 7/38* (2013.01); *B60N 2/80* (2018.02); *B60N 2/838* (2018.02); *B60N 2/847* (2018.02)

(58) Field of Classification Search
CPC .......... A47C 7/38; B60N 2/838; B60N 2/847; B60N 2/80
USPC ............................................... 297/408
See application file for complete search history.

(56) References Cited

U.S. PATENT DOCUMENTS

2006/0012233 A1   1/2006  Karlberg
2011/0221250 A1   9/2011  Little

FOREIGN PATENT DOCUMENTS

| KR | 2000-0015501 |    | 12/2001 |
|----|--------------|----|---------|
| KR | 10-0403478   |    | 10/2003 |
| KR | 20-0356974   | Y1 | 7/2004  |
| KR | 10-2007-015210 |  | 10/2007 |
| KR | 10-0790535   |    | 1/2008  |
| KR | 10-0807977   | B1 | 2/2008  |
| KR | 10-0837521   | B1 | 6/2008  |
| KR | 10-2008-0101357 | A | 11/2008 |

*Primary Examiner* — Mark R Wendell
(74) *Attorney, Agent, or Firm* — Sunstein Kann Murphy & Timbers LLP

(57) ABSTRACT

The present invention relates to a headrest moving device, more particularly, relates to a headrest moving device wherein the user convenience is enhanced since the contact position between the moving unit and the return spring is changed according to the position of the headrest so that the forces being applied by a user are same or similar, that is, there is no significant difference in the operational forces when moving the headrest to either the minimum position or the maximum position thereof.

2 Claims, 21 Drawing Sheets

[Figure 1]
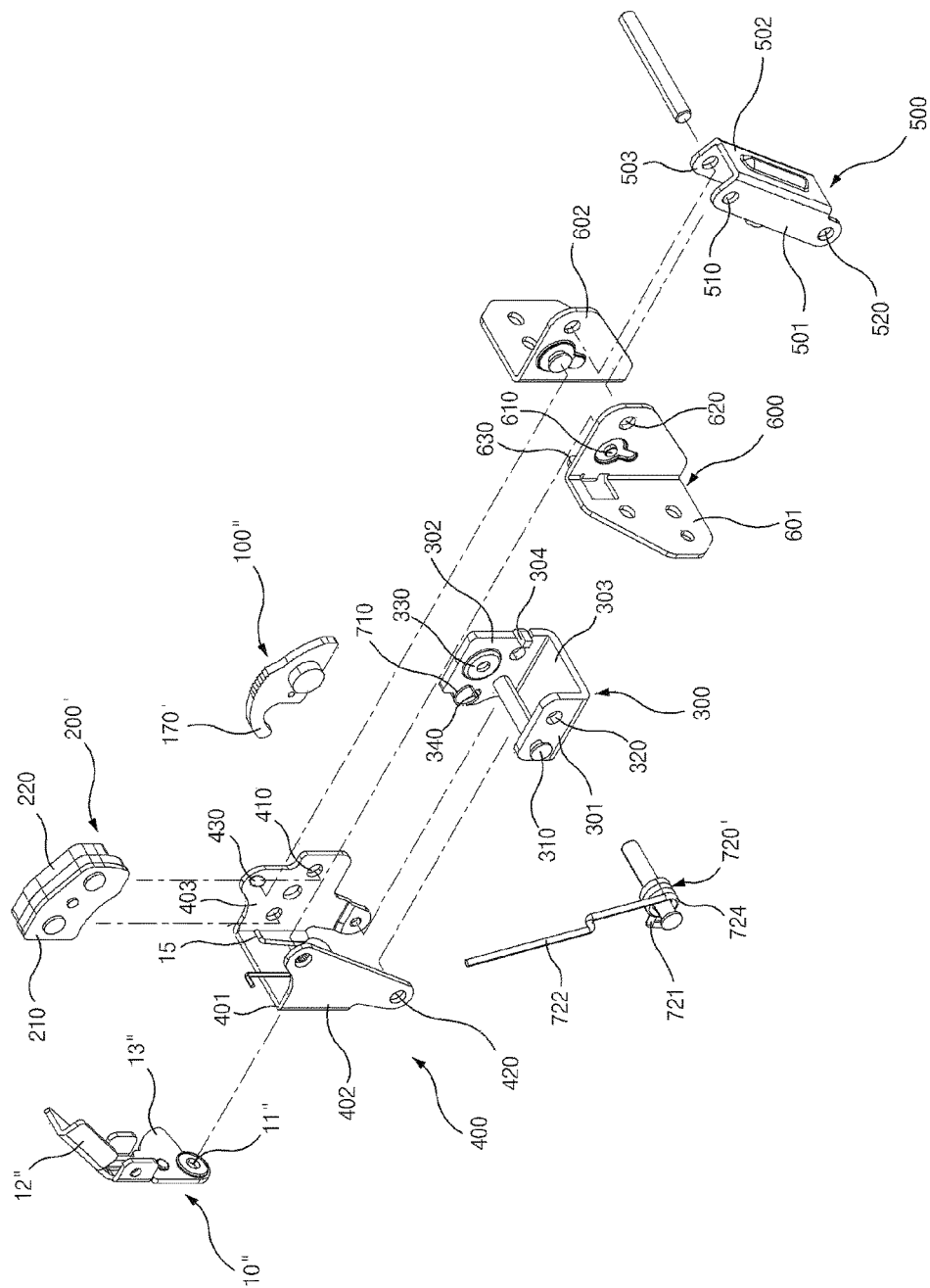

【Figure 2】
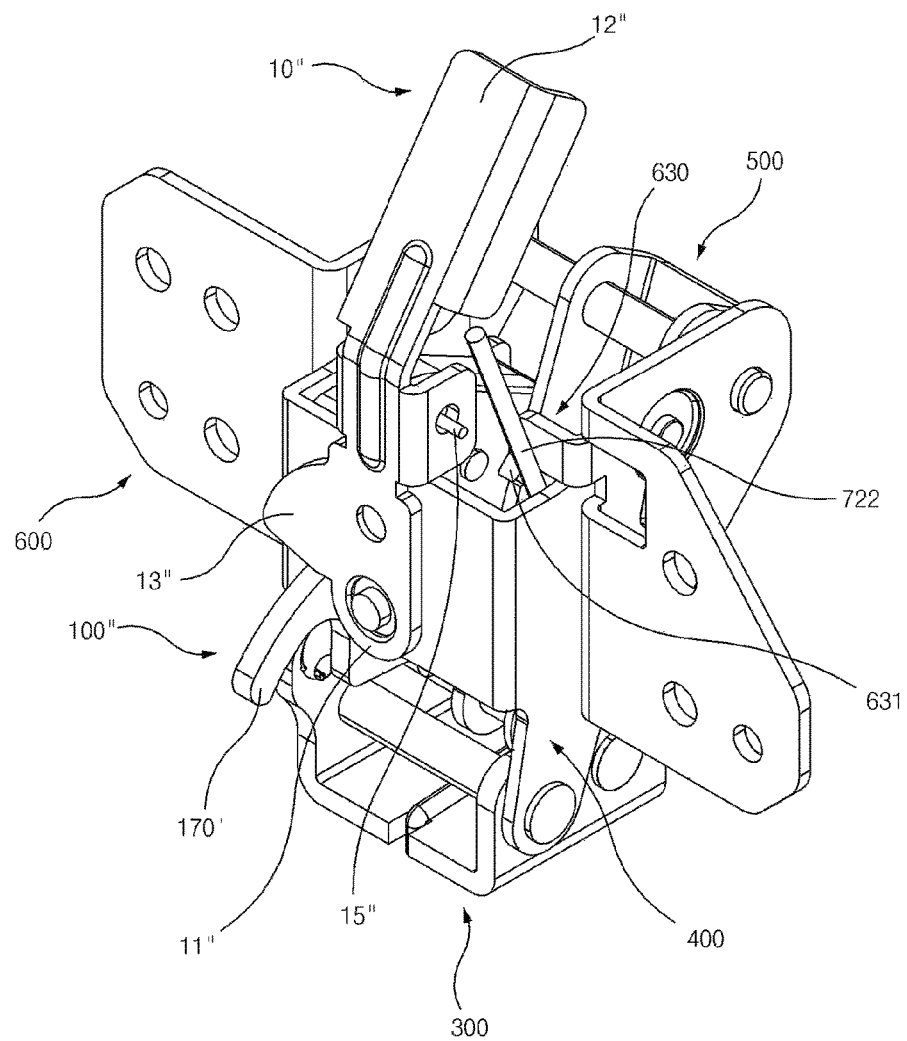

【Figure 3】
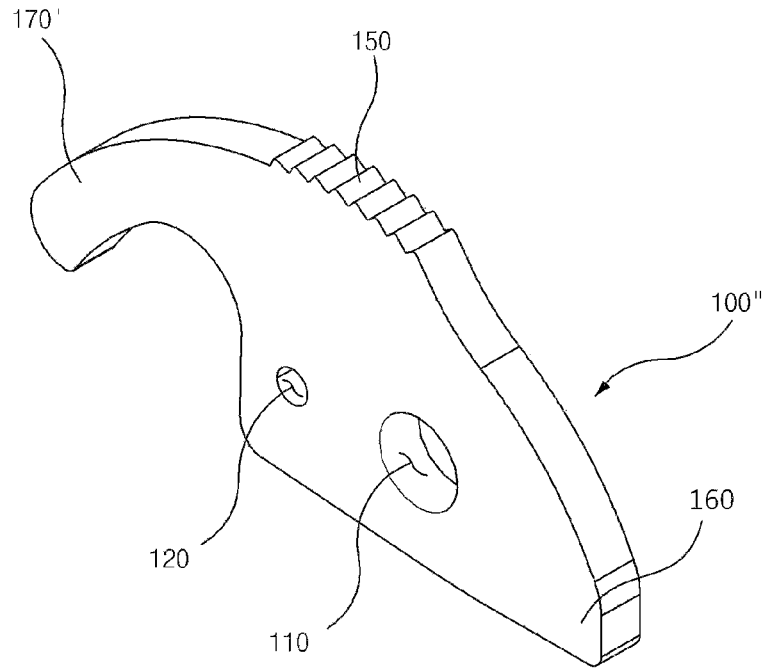
【Figure 4】
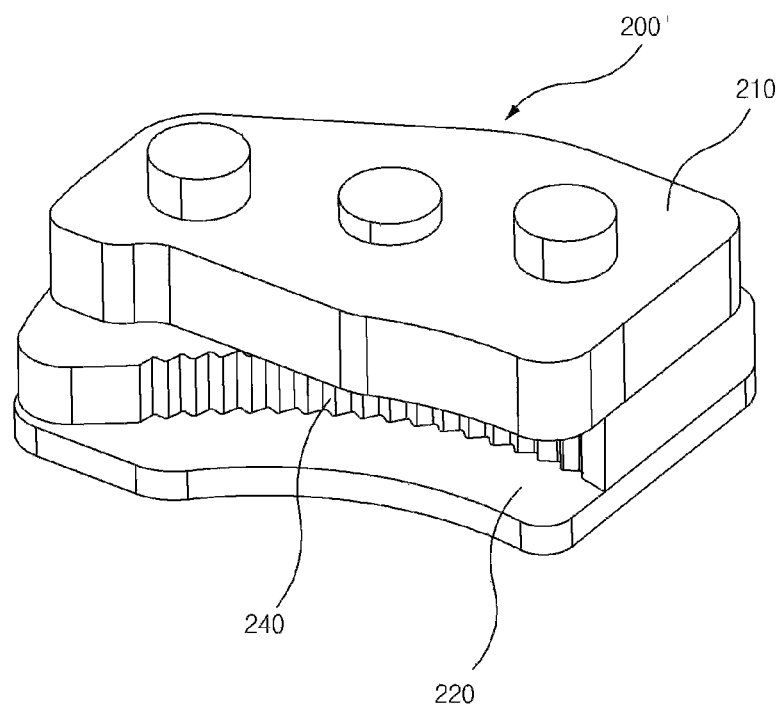

【Figure 5】
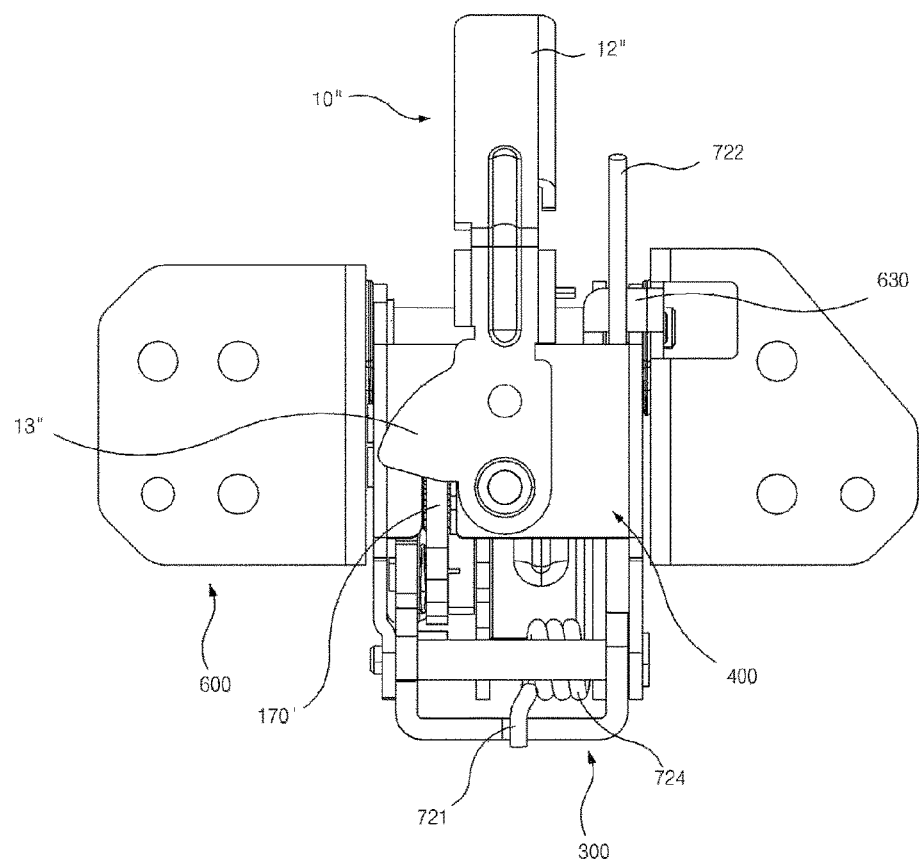

【Figure 6】
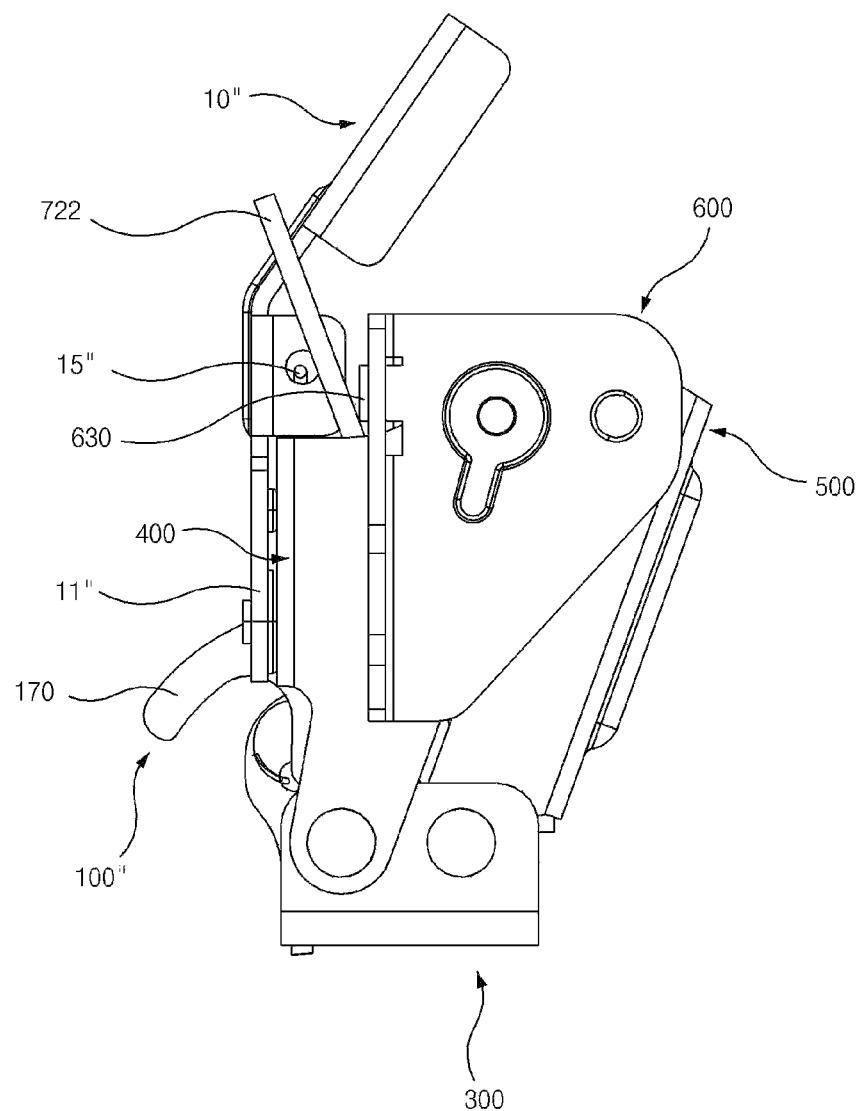

【Figure 7】
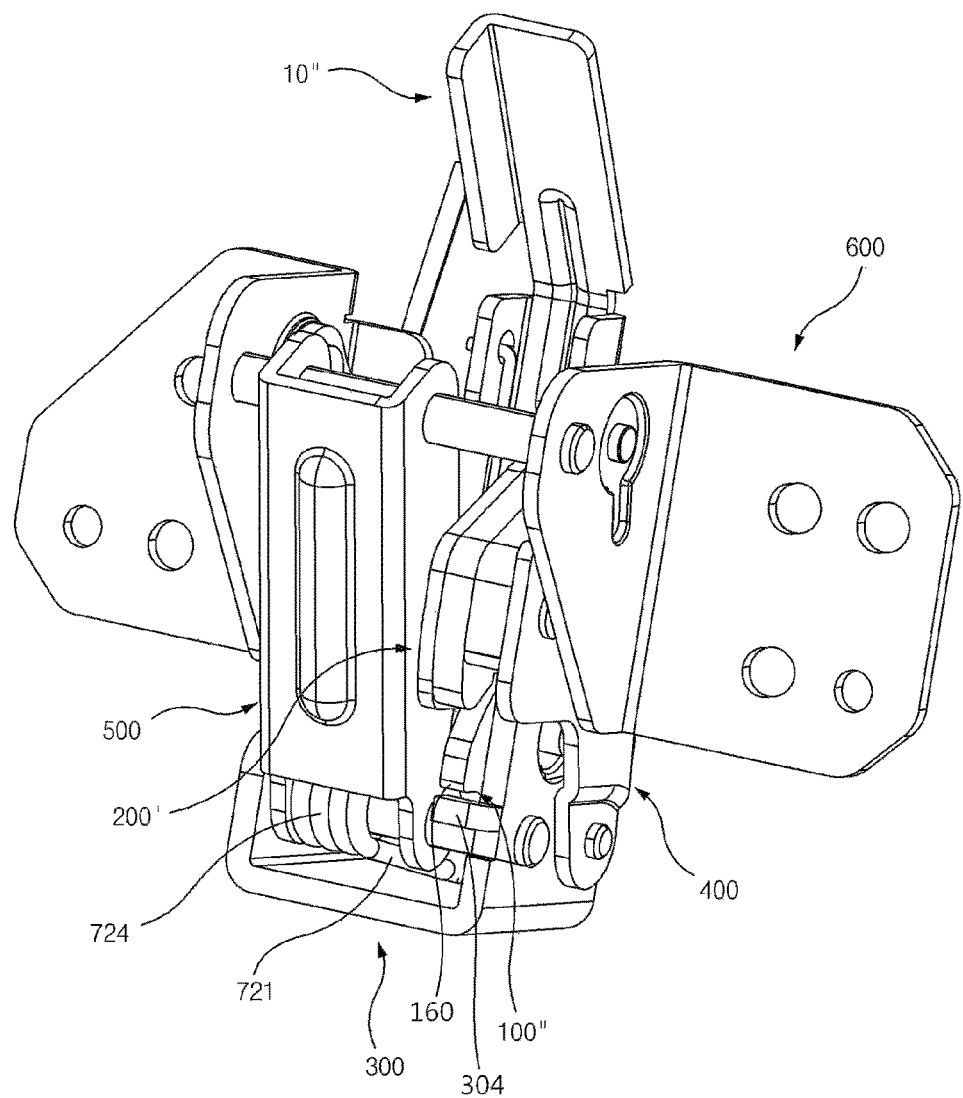

[Figure 8]
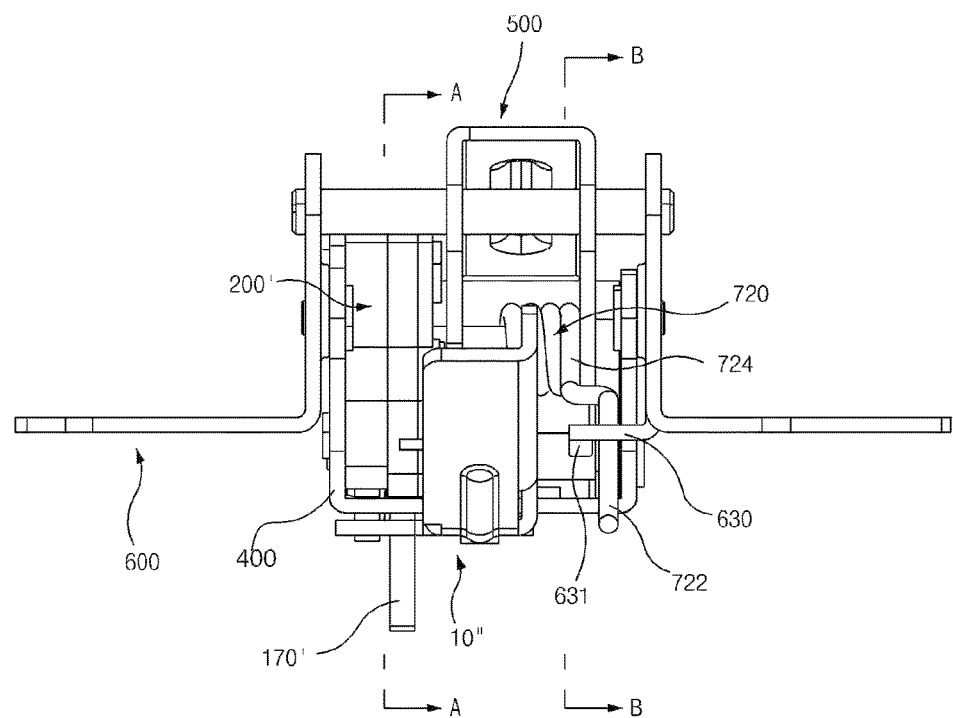

【Figure 9】
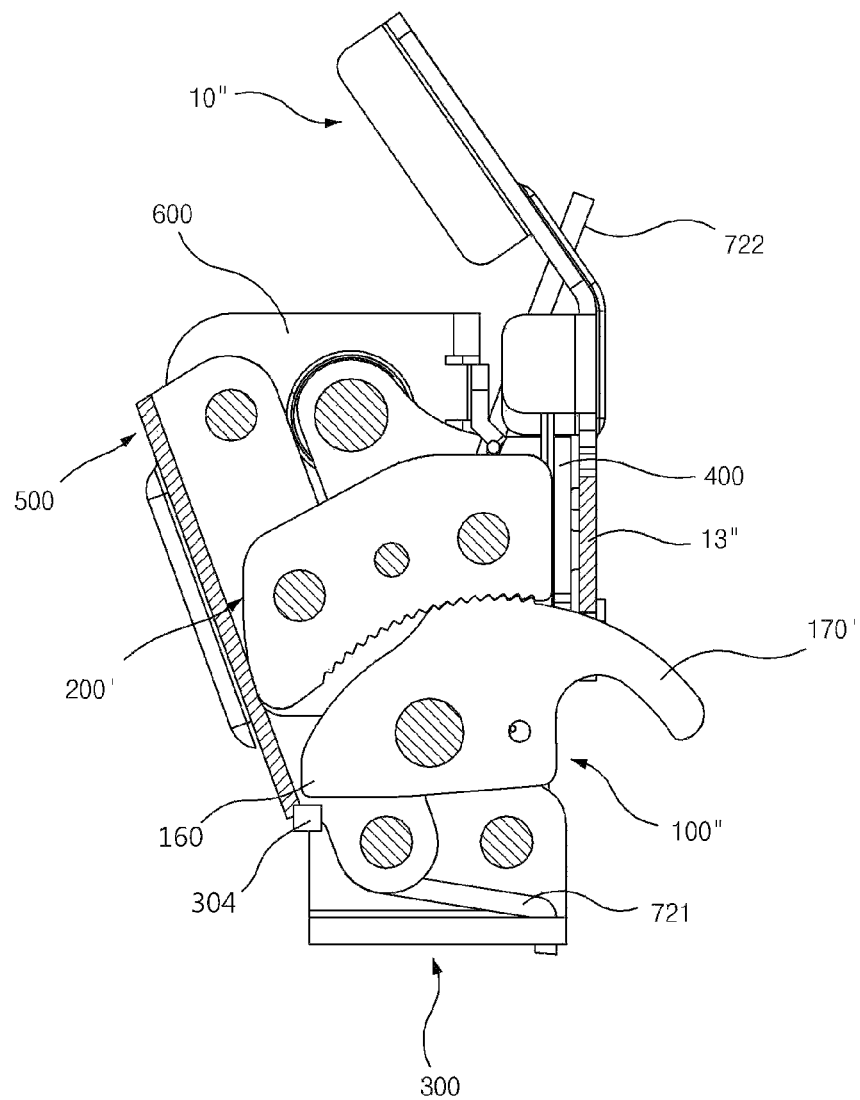

[Figure 10]
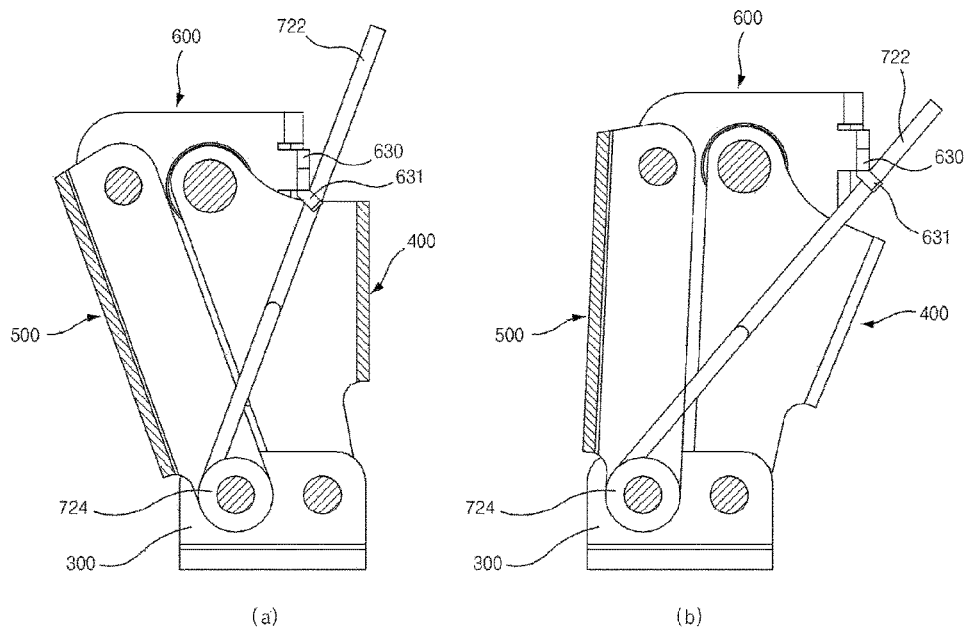
(a)  (b)
[Figure 11]
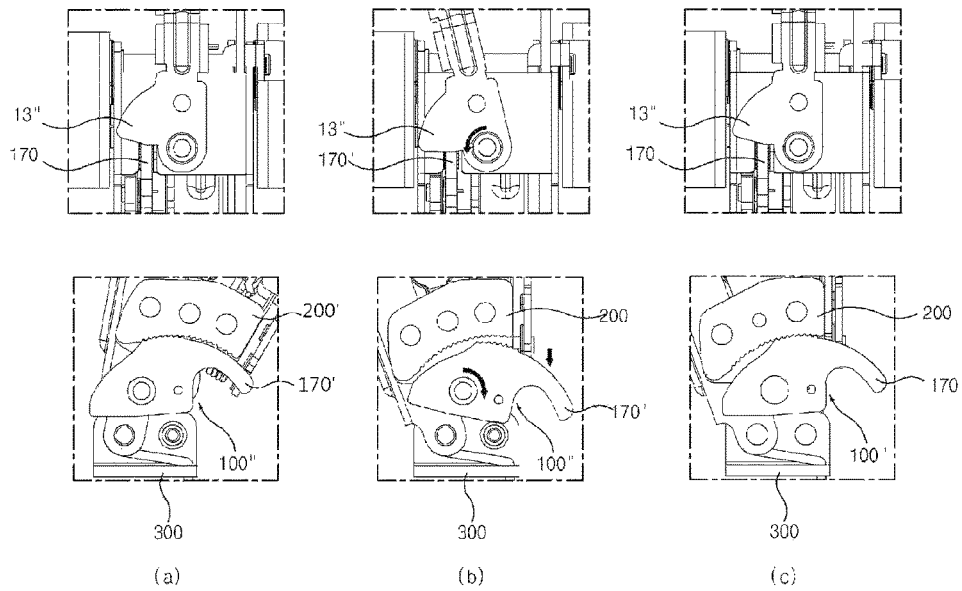
(a)  (b)  (c)

【Figure 12】
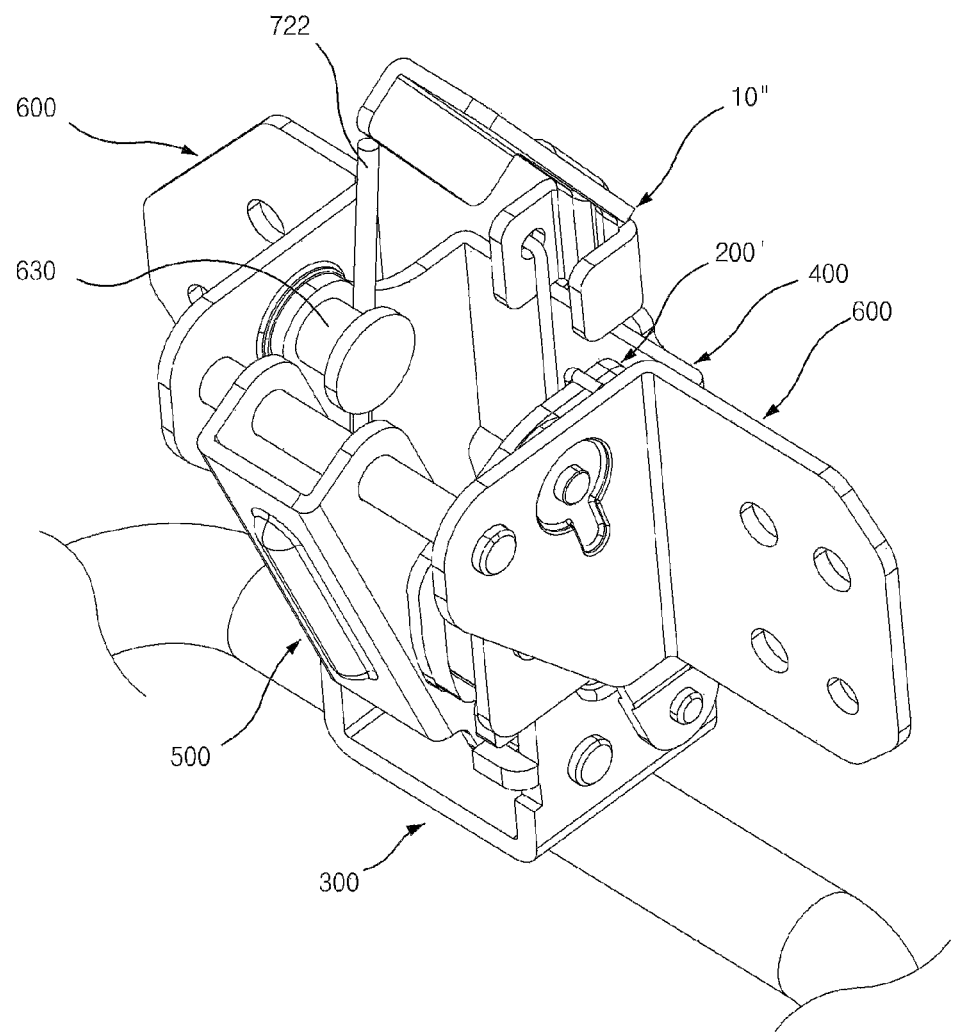

【Figure 13】
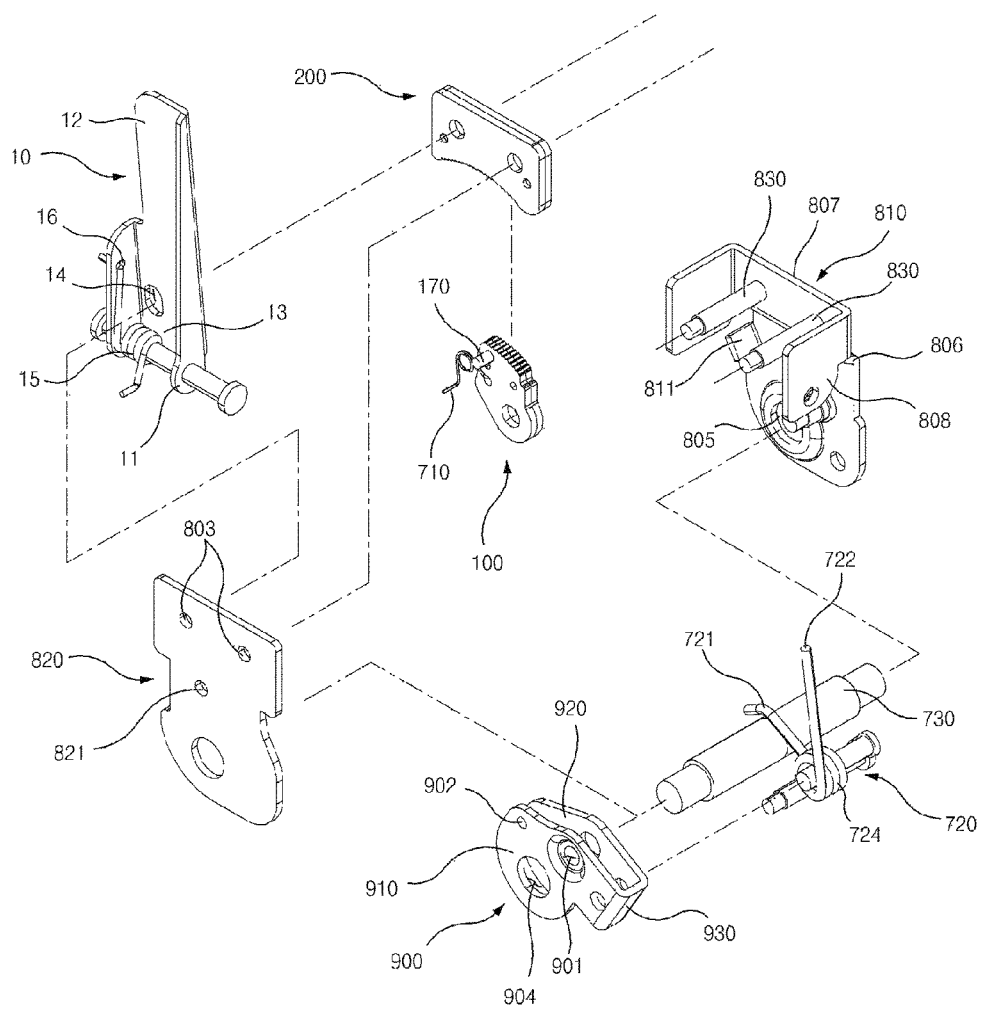

【Figure 14】
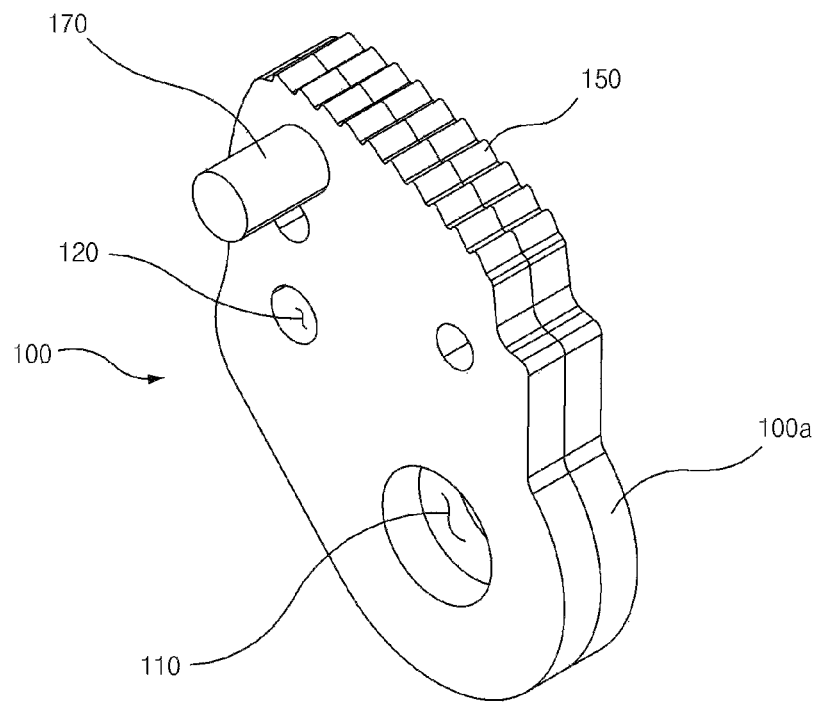

【Figure 15】
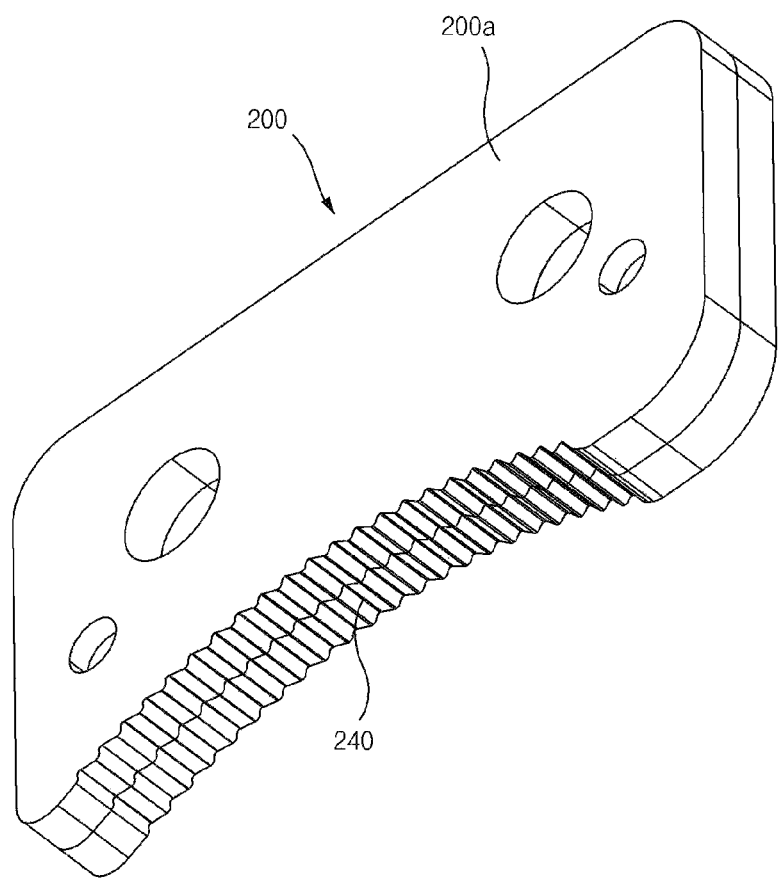

【Figure 16】
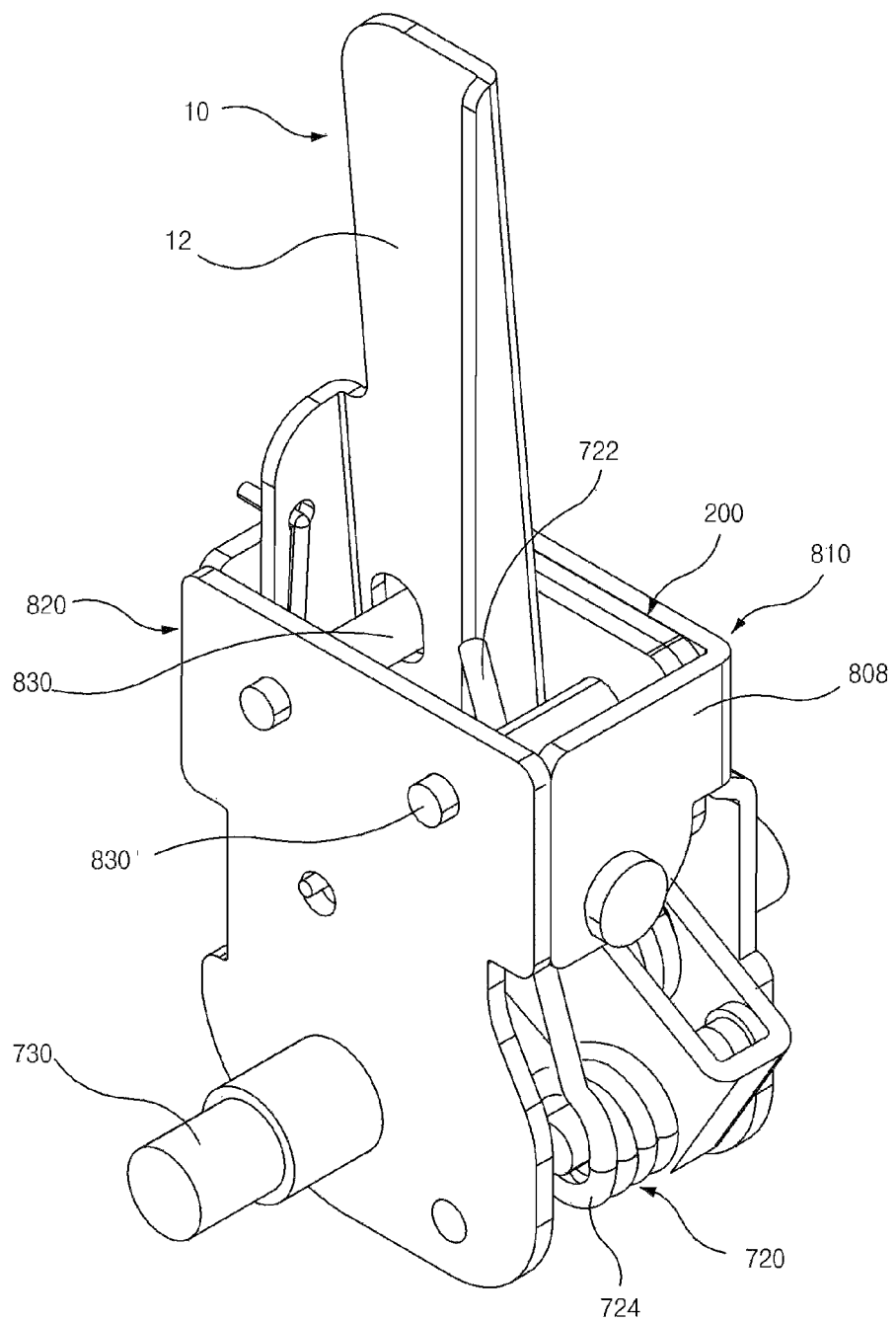

【Figure 17】
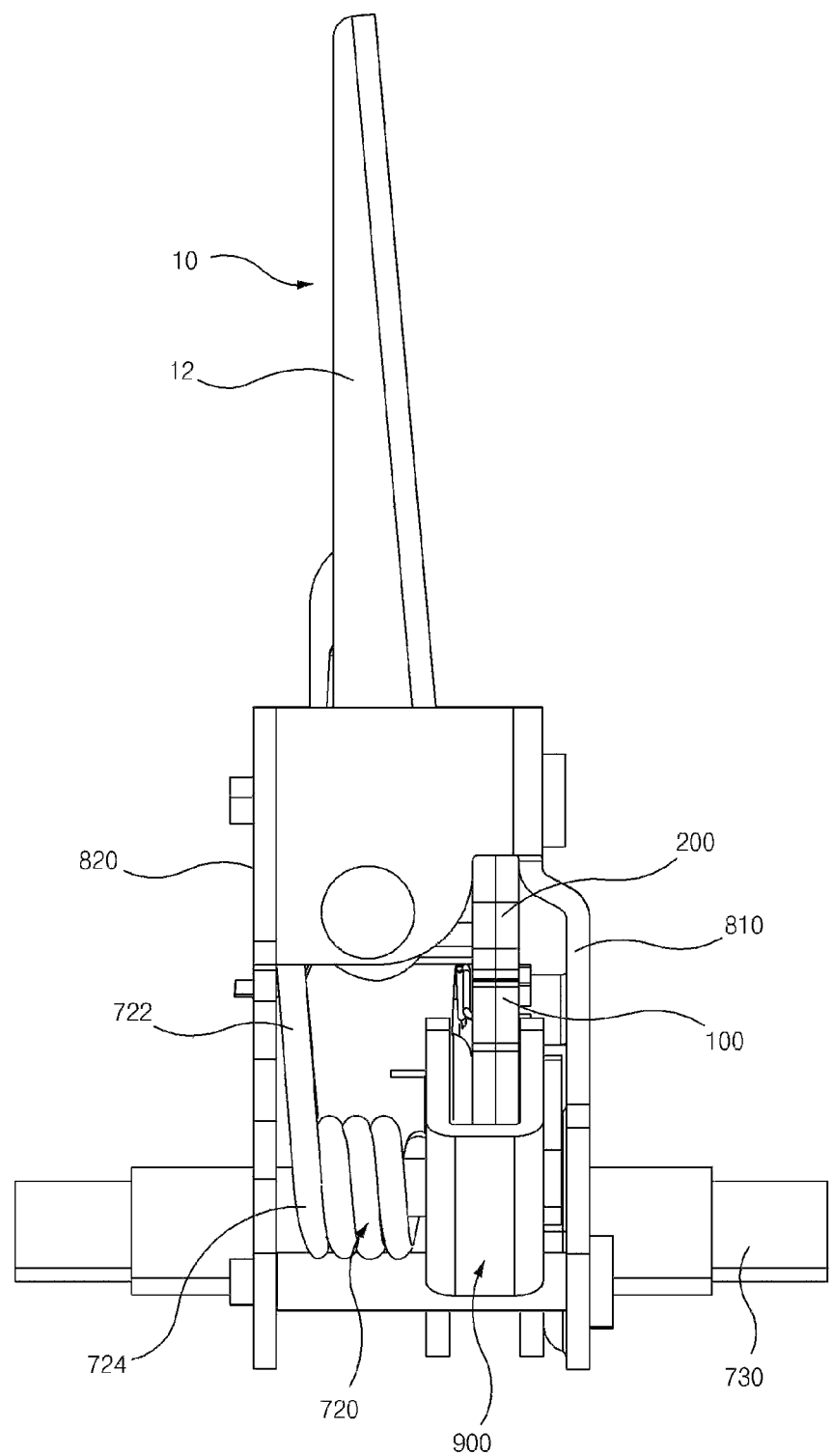

【Figure 18】
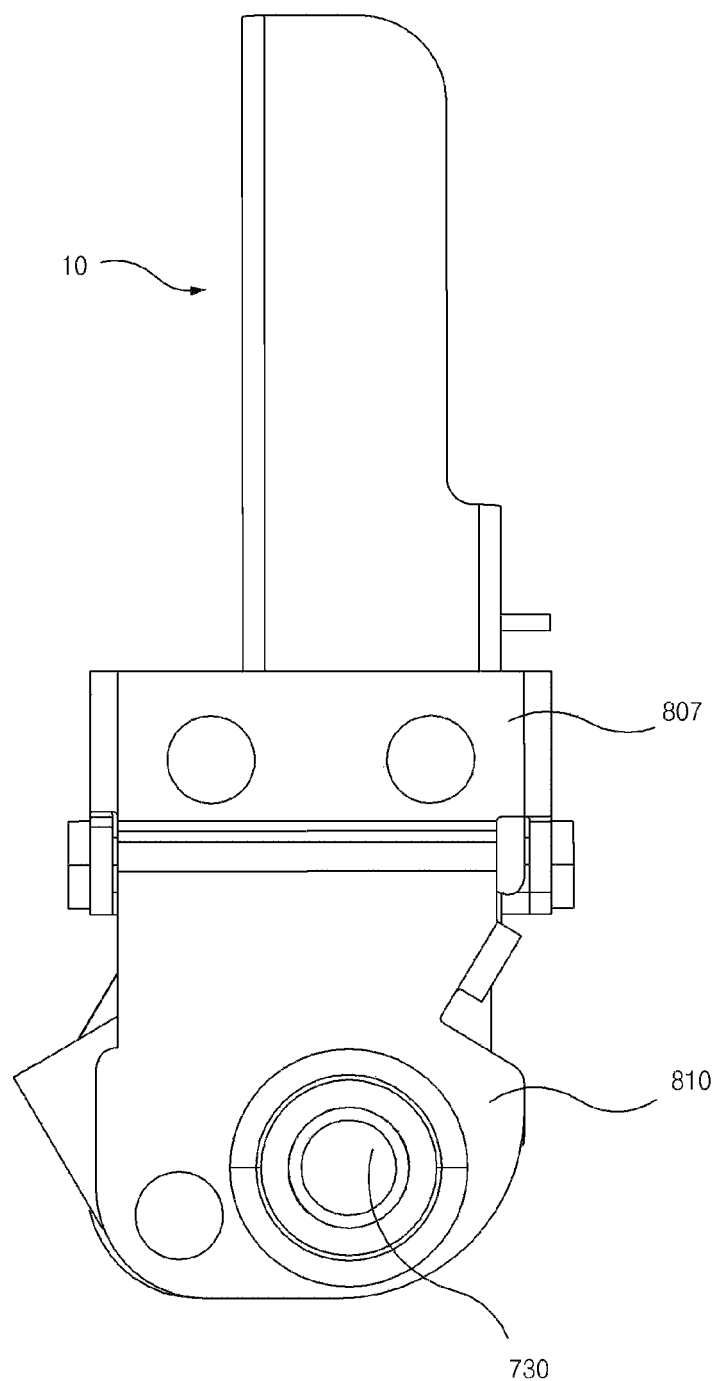

【Figure 19】
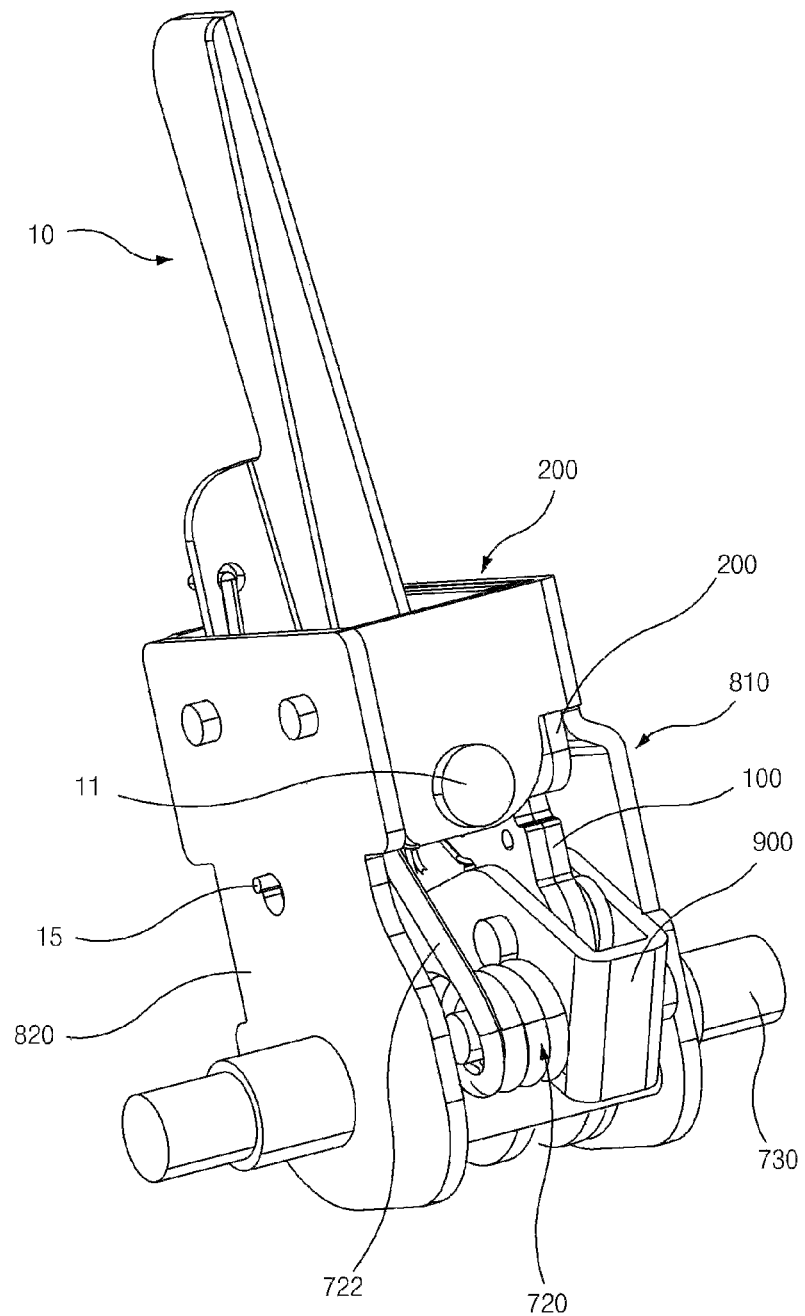

【Figure 20】
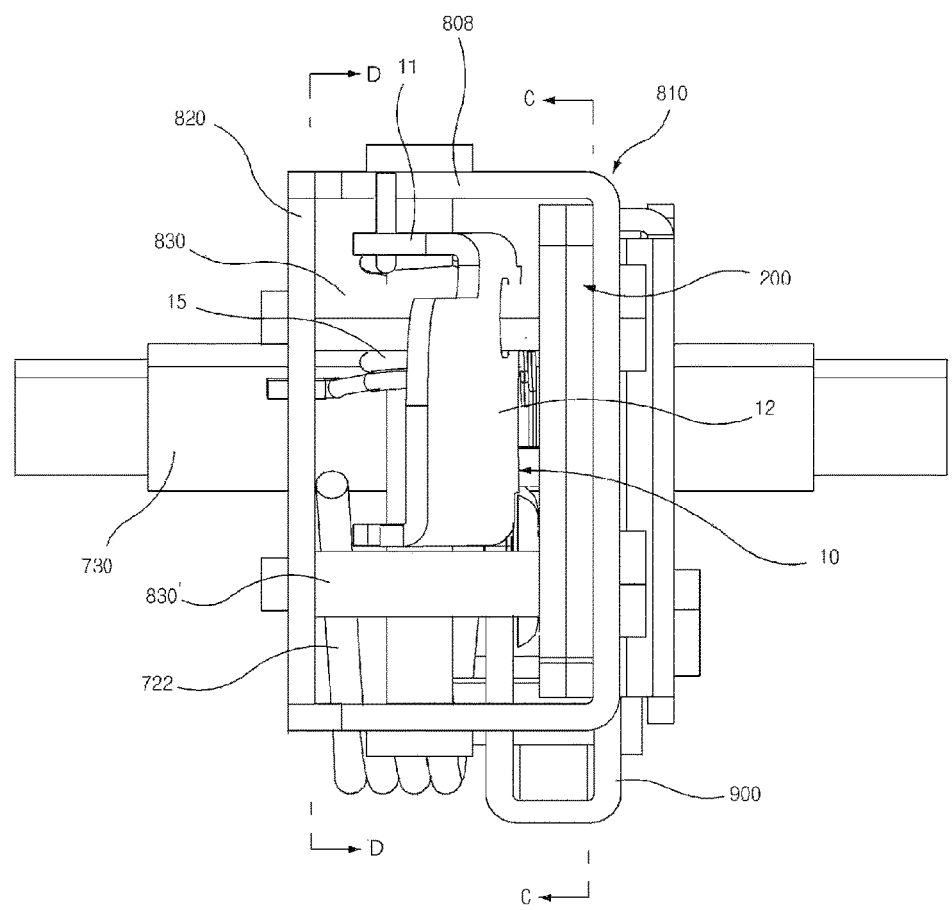

【Figure 21】
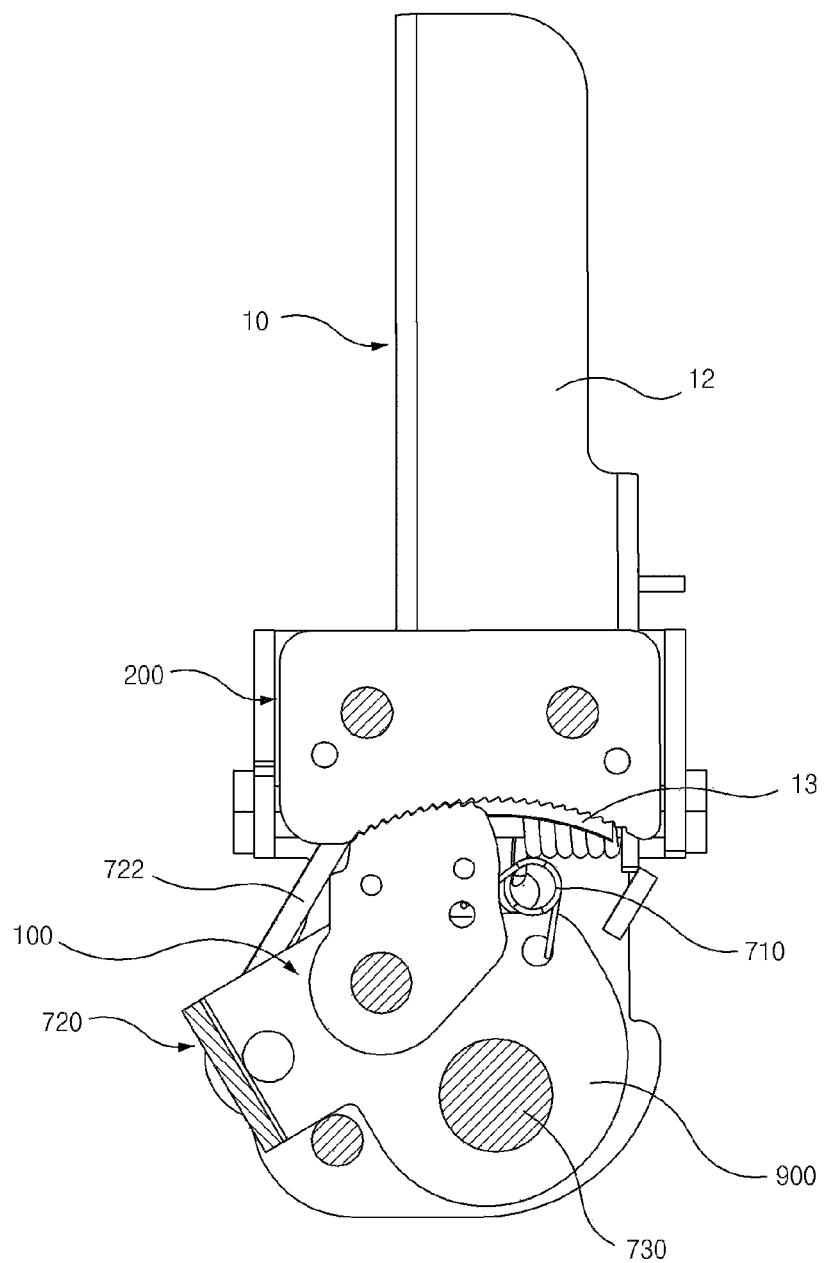

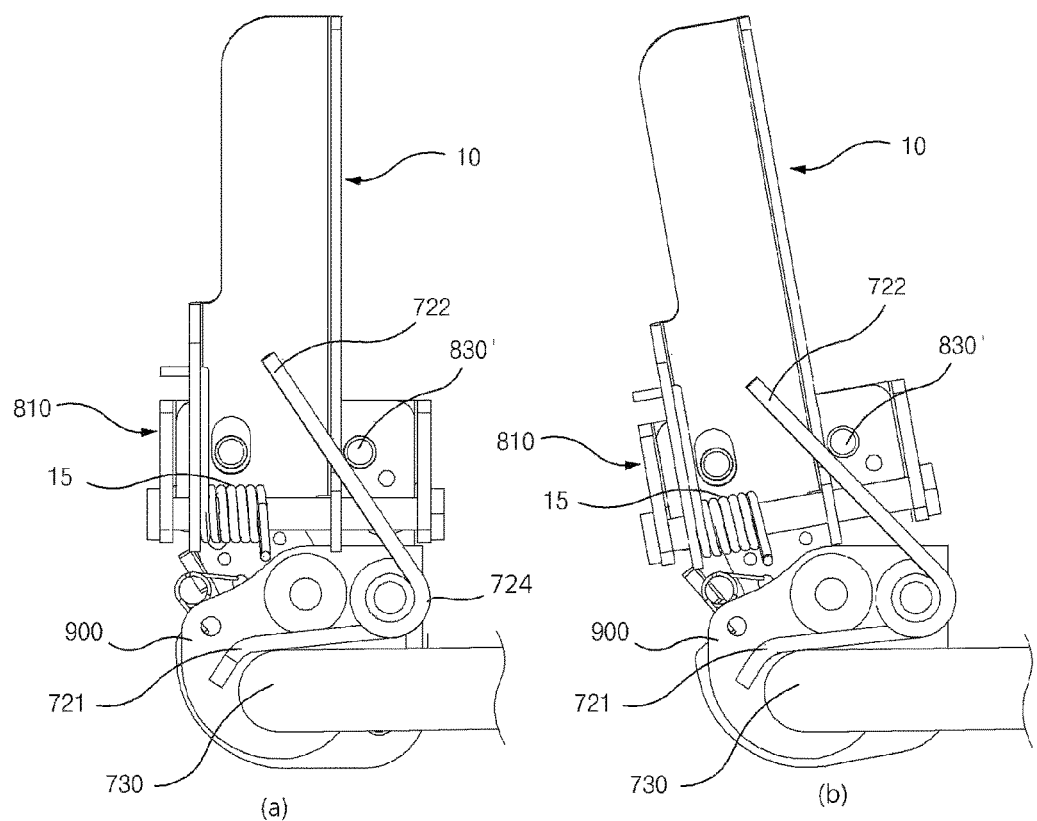
【Figure 22】

[Figure 23]
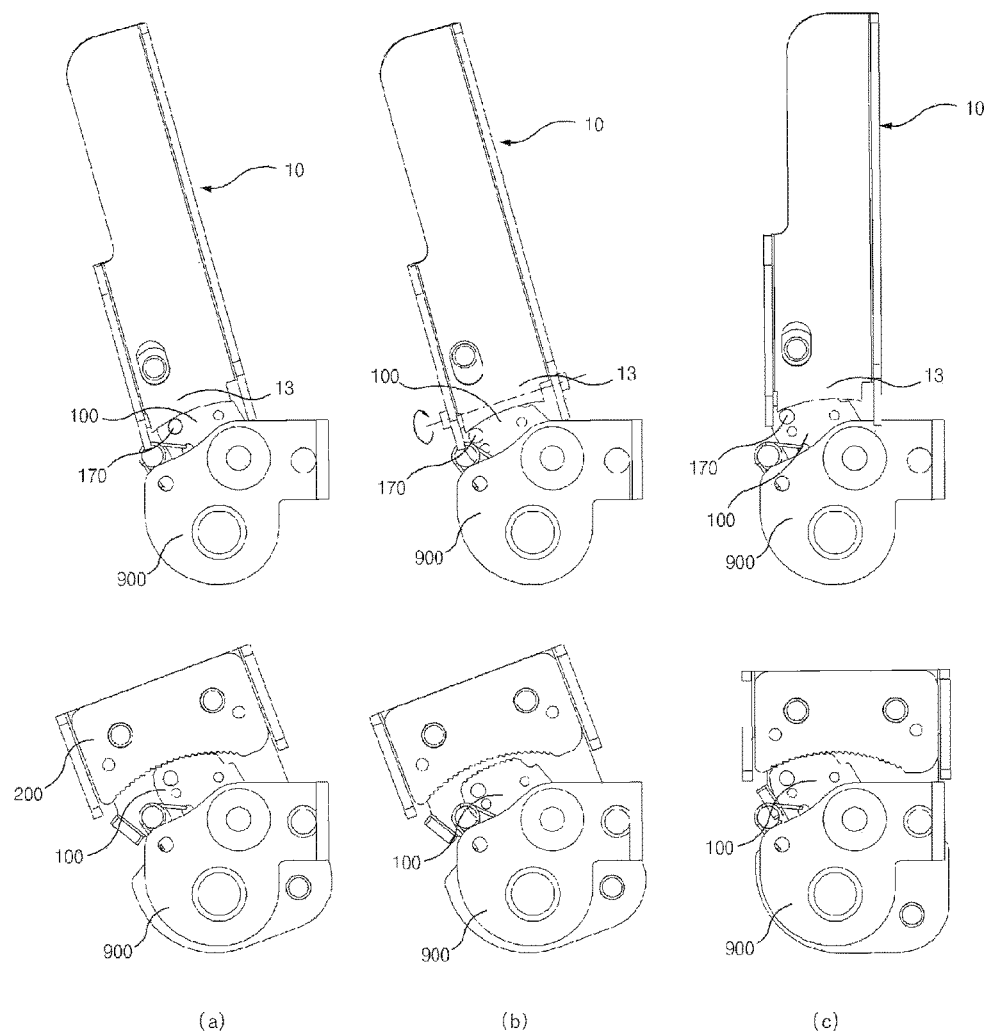
(a)　　　　　　　(b)　　　　　　　(c)

HEADREST MOVING DEVICE

This application is the national phase entry of international patent application no. PCT/KR2016/001937 filed Feb. 26, 2016 and claims the benefit of Korean patent application No. 10-2015-0033262, filed Mar. 10, 2015, the disclosures of which are incorporated herein by reference in their entirety.

TECHNICAL FIELD

The present invention relates to a headrest moving device, more particularly, relates to a headrest moving device wherein the contact position between the moving unit and the return spring is changed according to the position of the headrest.

BACKGROUND ART

In a prior art headrest, a headrest moving device having a tilting structure or a sliding structure is suggested wherein the gap between the headrest and the back of the passenger's head can be arbitrarily adjusted by rotating the headrest with respect to the fixed point thereof so as to be slanted for a certain degree while the headrest is being fixed to the backrest.

In a headrest of the prior art adopting a sliding structure or a tilting structure, a plurality of teeth is formed along the lengthwise direction so that the position of the headrest can be adjusted, and the headrest can be automatically returned by providing a return spring as suggested in Korea Patent No. 790535, Korea Utility Model Publication No. 2000-0015501, Korea Patent No. 403478, Korea Patent Publication No. 2007-0105210, and US Patent Publication No. 2011-0221250.

However, such a prior art structure is inconvenient for a user in that since the force for moving the headrest must be increased as the headrest is moving further from the initial position thereof when moving the headrest because the stopping position of the headrest moving device remains the same.

Technical Problem

An objective of the present invention devised for solving the above mentioned problems is to provide a headrest moving device wherein the user convenience is enhanced since the forces being applied by a user are same or similar, that is, there is no significant difference in the operational forces when moving the headrest to either the minimum position or the maximum position thereof.

Technical Solution

To achieve above described objective, the headrest moving device of the present invention is characterized in that and includes: a moving unit, whose one side is connected to the headrest and the other side is connected to a stay rod, for moving the headrest with respect to the stay rod; a locking unit for maintaining the position of the headrest after being moved thereto; and a return spring, whose one portion is fixed to the stay rod and the other portion is in contact with the moving unit, for returning the moving unit, wherein the contact position is varied according to the position of the headrest.

As the moving distance of the headrest increases, the contact position thereof is getting further from the center of the return spring, and the moving unit further includes: a second link pivotally and rotatably connected to one side of the stay rod; a third link pivotally and rotatably connected to the other side of the stay rod; and a fourth link whose one side is pivotally and rotatably connected to the second link and the other side is pivotally and rotatably connected to the third link, wherein the headrest can be connected to anyone of the second link, the third link, and the fourth link.

A protrusion being contact with the return spring is formed in the moving unit, and the protrusion can be formed in the side portion of the moving unit.

The locking unit includes a ratchet and a pole which is geared with the ratchet, and the moving unit further includes a first bracket being installed in the stay rod and a second bracket which is pivotally and rotatably installed in the stay rod and being connected to the headrest, wherein the pole is pivotally and rotatably installed in the first bracket, and the ratchet is installed in the second bracket, and provided with a spring whose both ends are respectively connected to the first bracket and the pole so that the gearing between the pole and the ratchet is being maintained.

Advantageous Effects

As described above, according to a headrest moving device of the present invention, there are advantageous effects as follows.

The user convenience is enhanced by changing the contact position between the moving unit and the return spring in accordance with the position of the headrest so that the forces being applied by a user are same or similar, that is, there is no significant difference in the operational forces when moving the headrest to either the minimum position or the maximum position thereof.

The structure of the moving unit can be simplified by forming a protrusion being contact with the return spring.

The protrusion may be formed in the side portion of the moving unit and thus the unit can be more compact in size.

DESCRIPTION OF DRAWINGS

FIG. 1 is an exploded perspective view of the headrest moving device viewing from the backside thereof according to the first exemplary embodiment of the present invention.

FIG. 2 is an assembled perspective view of FIG. 1 viewing from the front.

FIG. 3 is a perspective view of the pole in FIG. 1.

FIG. 4 is a perspective view of the ratchet in FIG. 1 viewing from the bottom.

FIG. 5 is a front view of FIG. 2.

FIG. 6 is a right side view of FIG. 2.

FIG. 7 is a perspective view of FIG. 2 viewing from the back.

FIG. 8 is a plan view of FIG. 2.

FIG. 9 is a cross-sectional view along the line A-A in FIG. 8.

FIG. 10 is a set of the cross-sectional views (cross-sections along the line B-B in FIG. 9) illustrating the operating states showing the contact position between the return spring and the moving unit of the headrest moving device according to the first exemplary embodiment of the present invention depending on the position of the headrest.

FIG. 11 is a set of operational state views showing the process of releasing the geared state between the pole and the ratchet using the lever member of the headrest moving device according to the first exemplary embodiment of the present invention. (The upper portion of FIG. 11 is a set of partial exploded front views of the lever member, and the lower portion is a set of side views of the pole and the ratchet.)

FIG. 12 is a perspective view from the backside showing another exemplary embodiment of the protrusion of the headrest moving device according to the first exemplary embodiment of the present invention.

FIG. 13 is an exploded perspective view of a headrest moving device according to the second exemplary embodiment of the present invention.

FIG. 14 is a perspective view of the pole in FIG. 13.

FIG. 15 is a perspective view of the ratchet in FIG. 13.

FIG. 16 is an assembled perspective view of FIG. 13 viewing from the back.

FIG. 17 is a rear view of FIG. 16.

FIG. 18 is a left side view of FIG. 16.

FIG. 19 is a perspective view of FIG. 16 viewing from the back.

FIG. 20 is a plan view of FIG. 16.

FIG. 21 is a cross-sectional view along the line C-C in FIG. 20.

FIG. 22 is a set of the cross-sectional views (cross-sections along the line D-D in FIG. 21) illustrating the operating states showing the contact position between the return spring and the moving unit of the headrest moving device according to the second exemplary embodiment of the present invention depending on the position of the headrest.

FIG. 23 is a set of operational state views showing the process of releasing the geared state between the pole and the ratchet using the lever member of the headrest moving device according to the second exemplary embodiment of the present invention. (The upper portion of FIG. 23 is a set of partial exploded front views of the lever member, and the lower portion is a set of side views of the pole and the ratchet.)

MODE FOR INVENTION

Hereinafter, a headrest moving device according to a preferred exemplary embodiment of the present invention will be described in detail with reference to the accompanying drawings as follows.

For reference, components of the present invention which are the same as those of the prior art as described above will not be described separately while referring to the prior art described above.

Embodiment 1

As illustrated in FIGS. 1 to 11, a headrest moving device according to an exemplary embodiment of the present invention is characterized in that and includes: a moving unit, whose one side is connected to the headrest and the other side is connected to a stay rod, for moving the headrest with respect to the stay rod; a locking unit for maintaining the position of the headrest after being moved thereto; and a return spring (720'), whose one portion is fixed to the stay rod and the other portion is in contact with the moving unit, for returning the moving unit, wherein the contact position is varied depending on the position of the headrest.

One side of the moving unit is connected to the headrest and the other side thereof is connected to the stay rod, and moves the headrest along the forward and backward direction with respect to the stay rod installed in the seat. The moving unit according to the first exemplary embodiment slides the headrest along the forward and backward direction.

As illustrated in FIGS. 1 and 2, the moving unit includes: a first link 300 connected to the stay rod; a second link 400 pivotally and rotatably installed in one side of the first link 300; a third link 500 pivotally and rotatably installed in the other side of the first link 300; and a fourth link 600 whose one side is pivotally and rotatably connected to one side of the second link 400 and the other side is connected to the third link 500. In other words, the moving unit moves the headrest using four links.

The first link 300 is fixedly installed in the upper center portion of the horizontal rod of the stay rod.

The first link 300 includes sidewalls 301 and 302 disposed vertically at both sides, and a bottom surface 303 connecting the lower portions of the sidewalls 301 and 302 and being installed in the upper portion of the horizontal rod.

In the sidewalls 301 and 302, coupling holes 310 and 320 are penetratingly formed along the width direction. The coupling holes 310 and 320 are respectively disposed in the front and the back.

In the sidewall 302 disposed in the left side, a pole coupling hole 330 is penetratingly formed along the widthwise direction so as to be disposed in the upper side of the coupling holes 310 and 320. A shaft is inserted into the pole coupling hole 330 and the coupling hole 110 of the pole 100", thereby installing the pole 100" pivotally and rotatably in the first link 300.

In the sidewall 302 a spring insertion hole 340 is formed so as to be disposed in the upper side of the coupling holes 310 and 320 and in the front side of the pole connecting hole 330.

In the back side of the side wall 302 a stopping threshold 304 is formed inwardly protruded so as to be disposed in the lower side of the pole coupling hole 330.

The second link 400 is installed in one side (front) of the first link 300 so that it can be pivotally rotated through the shaft.

The second link 400 includes sidewalls 402 and 403 being formed in the front surface 401 and the both sides of the front surface 401.

An opening is formed in the front surface 401 so as not to be interfered with the pole 100" which will be described later.

In the sidewalls 402 and 403, coupling holes 430 and 420 are formed in the upper side and the lower side respectively, and the shaft is inserted into the coupling holes 430 and 420, thus the second link 400 is pivotally and rotatably connected to the fourth link 600 and the first link 300. The coupling holes 430 and 420 are crossly disposed in a way that the coupling hole 420 disposed in the lower side is more forwardly disposed than the coupling hole 430 disposed in the upper side.

In the sidewall 403 disposed in the left side, a plurality of ratchet coupling holes 410 are formed along the forward and the backward direction so as to be disposed between the coupling holes 430 and 420. In the outside of the sidewall 403, a groove is formed so as to be communicating with the ratchet coupling hole 410, and the groove is formed by inwardly bending a portion of the sidewall 403.

The third link 500 is pivotally and rotatably formed in the other side (backside) of the first link 300.

The third link 500 includes a back surface 502 and the sidewalls 501 and 503 formed in the both sides of the back surface 502.

A protruded plate is formed in the lower side of the sidewall 501 disposed in the right side.

Coupling holes 510 and 520 are formed in the upper and the lower side of the sidewalls 501 and 503.

The third link 500 is slantly disposed in a way that the coupling hole 520 disposed in the lower side is disposed in the front side at the initial state.

The coupling holes 510 and 520 are inserted with a shaft, thus the third link 500 is pivotally and rotatably connected to the first link 300 and the fourth link 600.

One side (front side) of the fourth link 600 is pivotally and rotatably connected to the second link 400, and the other side (back side) is pivotally and rotatably connected to the third link 500.

The fourth link 600 is disposed at the both sides of the second link 400 and the third link 500 respectively.

The fourth link 600 includes a side plate 602 and an installation plate 601 formed outwardly bended in front of the side plate 602.

In the installation plate 601, a molded part constituting the headrest is installed.

A foam material is disposed between the exterior leather and the molded part of the headrest.

Unlike the previous description, the headrest may be installed in the second link 400 or the third link 500.

Coupling holes 610 and 620 are formed in the front side and the backside of the side plate 602 respectively.

The shaft is inserted into the coupling holes 610 and 620, thus the front side and the back side of the fourth link 600 are pivotally and rotatably installed in the second link 400 and the third link 500.

A protrusion 630 is formed inwardly protruded in the upper side of the fourth link 600 disposed at the left side. The protrusion 630 is disposed inside of the side portion of the moving unit.

The protrusion 630 is formed by inwardly bending a portion being cut from the installation plate 601 and the side plate 602.

The protrusion 630 is disposed in the upper side of the second link 400.

Further, a stopper 631 is formed forwardly protruded in the lower inner side of the protrusion 630. Due to such stopper 631 the return spring 720', which will be described later, will not be separated from the fourth link 600.

The locking unit maintains the moved position of the headrest.

The locking unit includes a pole 100", a ratchet 200' geared with the pole 100", and a spring 710 which maintains the gearing state between the pole 100" and the ratchet 200'.

The pole 100" is vertically disposed along the forward and backward direction, and formed to be a plate like shape, and a plurality of teeth 150 are formed in the upper side thereof along the width direction and the length direction.

As illustrated in FIG. 3, a coupling hole 110 is formed in the lower back side of the pole 100" penetrating along the width direction.

A spring insertion hole 120 is formed in the lower side of the pole 100" so as to be disposed in the front side of the coupling hole 110.

A stopper 170' is protrudedly formed in the front end of the pole 100" so as to be protruded further than the front end of the second link 400. The stopper 170' is downwardly and curvedly formed to be an arc shape. In this way, forming of a pole 100" becomes easier since the stopping protrusion 107' is formed along the forward and backward direction. The stopping protrusion 170' is inserted into the opening formed in the front surface 401 of the second link 400.

In addition, a protrusion 160 is formed backwardly protruded in the lower backside of the pole 100". The protrusion 160 is more backwardly protruded than the teeth 150, as illustrated in FIGS. 7 and 9, a stopping threshold 304 of the first link 300 is disposed in the lower side of the protrusion 160.

The ratchet 200' is vertically disposed along the forward and backward direction, and formed to be a plate-like shape, and a plurality of teeth 240 is formed in the lower side along the length direction.

The teeth 150 and 240 of the pole 100" and the ratchet 200' are formed in a way that the movement of the headrest in one direction (forward direction) is allowed while the movement in the opposite direction (backward direction) thereof is not allowed.

As illustrated in FIG. 4, the teeth 240 being formed along the length direction are formed to be an arc-like shape.

The ratchet 200' is installed in the second link 400 and connected to the headrest.

A guide plate 220 is installed in the right side of the ratchet 200' and an auxiliary plate 210 is installed in the left side thereof. A coupling hole is formed in the ratchet 200', the guide plate 220, and the auxiliary plate 210. The ratchet 200' is fixedly installed in the second link 400 by inserting a coupling member such as a bolt into the coupling hole formed in the ratchet 200' and the ratchet coupling hole 410.

The guide plate 220 is installed downwardly protruded than the teeth 240, and guide the pole 100" gearing with the ratchet 200'.

The auxiliary plate 210 is disposed between the second link 400 and the ratchet 200' and adjusts the separation distance between the second link 400 and the ratchet 200'.

The both ends of the spring 710 are connected to the first link 300 and the pole 100" respectively.

The both ends of the spring 710 are inserted (connected) into the first link 300 and the spring insertion holes 340 and 120 of the pole 100 respectively.

A portion of the return spring 720' is fixed to the stay rod and the other portion thereof is being contacted with the moving unit, thereby returning the moving unit.

The return spring 720', which is provided as a coil spring, comprises one end 721 having the shape of a straight line, the other end 722 having the shape of a straight line, and a coil portion 724 which connects the one end 721 and the other end 722 as illustrated in FIGS. 1, 2, and 5.

The return spring 720' is disposed in the inner lower side of the moving unit. To be more specific, the return spring 720' is disposed in the upper right side of the bottom surface 303.

The coil portion 724 of the return spring 720' is inserted into the shaft connecting the first link 300 and the third link 500.

A downwardly bended first bending portion is formed at the end of the one end 721.

The first bending portion is fixedly inserted into the groove formed in the front end of the bottom surface 303 of the first link 300.

The other end 722 is held by the protrusion 630 of the fourth link 600 and be in contact therewith. A second bending portion can be formed in the middle portion of the other end 722.

Further, a lever member 10" may be provided for releasing the gearing between the pole 100 and the ratchet 200 by pressing the pole 100.

The lever member 10" includes: a hinge portion 11" pivotally and rotatably installed in the second link 400; a handle portion 12" protrudedly formed in the upper side of the hinge portion 11"; and a pressing portion 13" protrudedly formed in the left side of the hinge portion 11" and pressing the stopping protrusion 170'.

The lever member 10" is formed with a sheet metal thus the size of the device can be maintained in a compact form.

The hinge portion 11" is pivotally and rotatably installed in the front side of the front surface 401. The shaft of the hinge portion 11" is disposed along the forward and backward direction.

The handle portion 12" is formed to be a bar shape and disposed along the up-down direction.

A backwardly and slantly bended backward bending portion is formed in the upper portion of the handle portion 12", and a downwardly bended hand stopper is formed in the right side of the backward bending portion.

Further, a first plate portion and a second plate portion, which are inwardly bended, are provided at the lower both sides of the backward bending portion in the handle portion 12". The first plate portion is disposed at the right side, and the second plate portion is disposed at the left side. A spring insertion hole is formed in the first plate portion. The second plate portion is stopped by the upper end of the first surface 401 of the second link 400, thus excessive rotation of the lever member 10" is prevented.

The pressing portion 13" is protrudedly formed at the left side of the hinge portion 11" and disposed in the upper side of the stopping protrusion 170'.

The lever return spring 15", which is provided as a coil spring, is inserted in the outer perimeter surface in front of the shaft of the hinge portion 11". The lever return spring 15" is disposed in the backside of the front surface 401.

One end of the lever return spring 15" is inserted into the spring insertion hole of the first plate portion.

The other end of lever return spring 15" is bended, and stopped by the upper portion of the ratchet 200'.

Hereinafter, the operation of an exemplary embodiment having aforementioned configuration will be described.

When sliding the headrest forward, if a user pushes the headrest forward the headrest (ratchet, and the second, the third and the fourth link) is moved forward with respect to the stay rod (pole and the first link) since the teeth 150 and 240 are formed to allow forward movement of the ratchet 200' with respect to the pole 100". When the headrest arrives at the desired position, a user removes the force pushing the headrest forward, then the pole 100" and the ratchet 200' are geared together, and this state of engagement is stably maintained by the spring 710, and thus the position of the headrest is fixed.

In such a way, when the headrest is moving forward from the initial position thereof, the other end 722 of the return spring 720' is stopped by the protrusion 630 and being contacted therewith. Therefore, when moving the headrest, the protrusion 630 is being sled with respect to the other end 722 of the return spring.

Due to this reason, the contact position (point) between the other end 722 of the return spring 720' and the protrusion 630 in the return spring 720' is varied according to the position of the headrest.

FIG. 10 shows the contact position of the return spring 720' with the moving unit according to the position of the headrest. In FIG. 10, the position of the headrest in position (b) is further moved forward than that of the headrest in position (a).

More specifically, as illustrated in FIG. 10, the contact position is getting further from the coil portion 724 which is the center of the return spring 720' as the moving distance of the headrest is increased.

Therefore, the contact position is close to the coil portion 724 in the position (backward direction) where the elastic deformation of the return spring 720' is small, while the contact position is far from the coil portion 724 in the position (forward direction) where the elastic deformation of the return spring 720' is large. Thus, the user convenience is enhanced since there is no significant difference in the forces being applied to the headrest by a user even the moving distance of the headrest is increased (that is, even it is moved forward to the end point). Further, there may be no significant difference in the operational force of the lever member 10" or the button even if the position of the headrest is being changed.

The forward and backward position of the headrest can be minutely adjusted (in steps of 1 to 9) using a plurality of teeth 150 and 240 along the lengthwise direction.

When moving the headrest backward, as illustrated in FIG. 11, if a user pushes the button (not shown) connected to the handle portion 12" of the lever member 10", or pushes the handle portion 12" (b) at any position, the lever member 10" is rotated counterclockwise and the stopping protrusion 170' is being pushed by the pressing portion 13" disposed in front of the second link 400, then the pole 100" is being rotated counterclockwise, thereby separating the pole 100" from the ratchet 200'. In this state the headrest can be moved to anywhere along the forward and backward direction. Also in this state if no force is applied to the headrest, the headrest is moved to the end of the backward direction by the return spring 720'.

If a user removes the force applied to the button or the handle portion 12", the lever member 10" is returned towards the clockwise direction by the lever return spring 15", thus the pressing portion 13" pressing the stopping protrusion 170' is returned to the original position thereby (c). Due to this operation the pole" is being rotated clockwise and geared with the ratchet 200', and the locking is accomplished thereby.

Unlike the aforesaid description, the protrusion 630' can be integrally formed in the shaft connecting the fourth link 600 disposed in the right side and the second link 400 as illustrated in FIG. 12. In other words, the protrusion 630' performs the role of a shaft connecting the fourth link 600 and the second link 400, and at the same time performs the role of a member contacting with the return spring 720'. Therefore, the protrusion 630' is more inwardly protruded than the inner surface of the right sidewall 402 of the second link 400. The protrusion 630' is formed to be rod shape having circular cross-section, and inserted into the coupling holes 610 and 430. In addition, a flange is formed at the end of the inner side of the protrusion 630', thus the separation of the return spring 720' from the protrusion 630 can be prevented.

Embodiment 2

As illustrated in FIGS. 13 to 23, a headrest moving device according to the second exemplary embodiment includes: a first bracket 900 installed in the horizontal rod 730 being connected to the seat; and a second bracket pivotally and rotatably installed in the horizontal rod 730, and being connected to the headrest.

The detailed explanation will be omitted for the same elements as those of the above described first exemplary embodiment.

The first bracket 900 includes sidewalls 910 and 920 being disposed at the both sides along the forward and backward direction; and the back surface 930 connecting the backside of the sidewalls 910 and 920 as illustrated in FIG. 13.

A pole coupling hole 901 is formed along the width direction in the upper portions of the sidewalls 910 and 920. A shaft penetrating through the pole 100, which will be described later, is installed in the pole coupling hole 901, so that the pole 100 is pivotally and rotatably installed in the first bracket 900.

A through-hole 904 where the horizontal rod 730 is penetrating through is formed in the lower portions 910 and 920, thus the first bracket 900 is fixed to the horizontal rod 730. Therefore, the first bracket 900 is connected to the stay rod.

The first bracket 900 is disposed at the left side of the return spring 720 which is inserted in the center of the horizontal rod 730.

A spring insertion hole 902 wherein the other end of the spring 710, which will be described later, is formed in the front upper portion of the sidewall 910 disposed at the right side.

The second bracket is disposed at the both sides of the first bracket 900 respectively, and includes sidewalls 810 and 820 which are vertically disposed along the forward and backward direction.

A through-hole 805, wherein the horizontal rod 730 is penetrating, is formed in the lower portions of the sidewalls 810 and 820, thus the second bracket is pivotally rotatable with respect to the horizontal rod 730, the first bracket 900, and the pole 100.

In the sidewall 810 disposed at the left side, an inwardly bended first bending portion 806 is formed in the center area, and an upwardly bended second bending portion 807 is formed at the end of the first bending portion 806.

In the second bending portion 807 and the sidewall 820 disposed at the right side, coupling holes 803 are formed one in the front side and one in the backside respectively. Pins 830 and 830' are inserted into the coupling holes 803 so that the ratchet 200 can be installed and at the same time the sidewalls 819 and 820 of the both sides are coupled to each other. Thus, the ratchet 200 is fixedly installed in the second bracket.

The pins 830 and 830' are formed in the shape of a rod and disposed along the left and right direction.

The pin 830' which is disposed in the back side additionally performs the role of a protrusion where the other end 722 of the return spring 720 is being contacted thereto.

Meanwhile, stopping thresholds are respectively formed at the right end portions of the pins 830 and 830', so that the separation distance of the sidewalls 810 and 820 of the both sides can be stably maintained.

In the upper portion of the sidewall 810 which is disposed at the left side, a third bending portion 808, whose front end and back end are extended to form an inwardly bended protruded portion, is formed.

A through-hole is formed along the forward and backward direction in the third bending portion 808.

Due to the third bending portion 808, a lever member 10, which will be described later, can stably installed in the second bracket.

A stopping protrusion 811 is formed in front side of the sidewall 810 which is disposed at the left side.

The locking unit includes: a pole 100, a ratchet 200 being geared with the pole, and a spring 710 which maintains the gearing state between the pole 100 and the ratchet 200.

The pole 100 is vertically disposed along the forward and backward direction and formed to be a plate like shape, and a plurality of teeth 150 are formed in the upper side thereof along the width direction and the length direction.

The pole 100 is formed by combining a plurality of plates 100a along the widthwise direction wherein the plates are formed with a plurality of teeth 150 along the lengthwise direction, thus a plurality of teeth 150 are formed along the widthwise direction.

A coupling hole 110 is penetratingly formed along the widthwise direction in the lower back portion of the pole 100.

A spring insertion hole 120 is formed in the lower portion of the pole 100 so as to be disposed in front of the coupling hole 110.

A stopping protrusion 170 is inwardly and protrudedly formed in the pole 100 along the widthwise direction.

The ratchet 200 is vertically disposed along the forward and backward direction and formed to be a plate-like shape, and a plurality of teeth 240 are disposed in the lower portion along the widthwise and lengthwise direction.

The teeth 150 and 240 of the pole 100 and the ratchet 200 are formed in a way that the movement (of the headrest) in one direction (forward direction) is allowed while the movement in the opposite direction (backward direction) thereof is not allowed.

The ratchet 200 is formed by combining a plurality of plates 200a along the widthwise direction wherein the plates are formed with a plurality of teeth 240 along the lengthwise direction, thus a plurality of teeth 240 are formed along the widthwise direction.

The teeth 240 being formed along the lengthwise direction are formed to be an arc-like shape.

The ratchet 200 is formed with a coupling hole so that a plurality of plates 200a are coupled together, and at the same time, the ratchet 200 is being fixed to the second bracket.

The ratchet 200 is fixedly installed to the second bracket and connected to the headrest.

The both ends of the spring 710 are inserted (connected) into the pole 100 and the spring insertion holes 120 and 902 of the first bracket 900 respectively.

One end 721 of the return spring 720 is fixed to the horizontal rod 730 and the other end 722 thereof is being contacted with the pin 830' of the moving unit, thereby returning the moving unit.

The end of the one end 721 is downwardly bended and being stopped by the horizontal rod 730.

The coil portion 724 which connects the one end 721 and the other end 722 is inserted in the spring shaft installed in the first bracket 900.

Further, a lever member 10, which separates the gearing of the pole 100 and the ratchet 200 by pressing the pole 100, is further included.

The lever member 10 is installed in the second bracket. In this way, the lever member 10 is installed in a portion where the ratchet 200 is being installed. Unlike the aforesaid description, the lever member 10 can be installed in a portion where the pole 100 is being installed.

The lever member 10 includes: hinge portions 11 pivotally and rotatably installed in the second bracket; a handle portion 12 protrudedly formed in one side of the hinge portions 11; and a pressing portion 13 protrudedly formed in the other side of the hinge portions 11 and pressing the stopping protrusion 170.

The lever member 10 is formed with a single sheet metal, and the hinge portions 11, the handle portion 12, and the pressing portion 13 are integrally formed. Thus, forming of the lever member 10 becomes easy, and the weight of the device is reduced.

The lever member 10 is made in a way that the front and the back of a single sheet metal are bended to form the hinge portions 11, and the upper portion of the sheet metal becomes the handle portion 12, and the lower portion of the sheet metal becomes the pressing portion 13. In other words, the handle portion 12 and the pressing portion 13 are integrally formed.

A lever return spring insertion hole 16 is formed in the upper portion of the hinge portion 11, and a hinge insertion hole, where the hinge disposed along the forward and backward direction is inserted, is formed in the front lower side of the hinge portion 11. The hinge is installed in the through-hole formed in the third bending portion 808.

The handle portion 12 is vertically formed between the hinge portions 11 disposed in the front and the back sides.

An elongated hole 14 is formed in the handle portion 12 along the up-down direction.

The pin 830 disposed in the front side is inserted in the elongated hole 14 and penetrating through the elongated hole 14. When a user moves the lever member 10 along the left and right direction, the lever member 10 can be rotated smoothly guided by such pin 830 and the elongated hole 14. Besides, excessive pressing of the lever member 10 is prevented.

The pressing portion 13 is formed in the lower portion of the handle portion 12. The pressing portion 13 is disposed in the upper portion of the stopping protrusion 170. The pressing portion 13 is formed to be an arc-like shape whose lower side is upwardly convex.

Further, a lever return spring 15 which returns the lever member 10 is provided.

The lever return spring 15 is provided as a coil spring and inserted into the front of the hinge which is being inserted to the hinge portion 11.

One end of the lever return spring 15 is inserted into the lever return spring insertion hole 16 formed in the upper portion of the hinge portion 11 disposed in the front side, and the other end is inserted into the lever return spring insertion hole 821 formed in the right sidewall 820 of the second bracket.

During the assembly, the ratchet 200 is disposed between the upper portion of the right sidewall 820 of the second bracket and the upper portion of the left sidewall 810 of the second bracket, and the lever member 10 is installed in the left sidewall 810, and the lever member 10 is inserted into the pin 830 which connects the both sidewalls 810 and 820.

The pole is disposed between the upper portion of the left sidewall 920 and the upper portion of the right sidewall 910 of the first bracket 900.

In addition, the right sidewall 820 of the second bracket, the return spring 720, the right sidewall 910 of the first bracket 900, the left sidewall 920 of the first bracket 900, the left sidewall 810 of the second bracket are sequentially disposed from the right side, and the first bracket and the second bracket 900 are densely installed in the center area of the horizontal rod 730.

Hereinafter, operation of an exemplary embodiment having above described configuration will be described.

When tilting the headrest forward, if a user pushes the headrest forward the headrest (ratchet, and the second bracket) is tilted forward with respect to the stay rod 730 (pole and the first bracket) since the teeth 150 and 240 are formed to allow forward movement of the ratchet 200 with respect to the pole 100. When the headrest arrives at the desired position, a user removes the force pushing the headrest forward, then the pole 100 and the ratchet 200 are geared together, and this state of engagement is stably maintained by the spring 710, and thus the position of the headrest is fixed.

In such a way, when the headrest is moving forward from the initial position thereof, the other end 722 of the return spring 720 is stopped by the pin 830' and being contacted therewith. Therefore, when moving the headrest, the pin 830' is being sled with respect to the other end 722 of the return spring.

Due to this reason, the contact position (point) between the other end 722 of the return spring 720 and the pin 830' in the return spring 720 is varied according to the position of the headrest.

More specifically, as illustrated in FIG. 22, the contact position is getting further from the coil portion 724 which is the center of the return spring 720 as the moving distance of the headrest is increased (as the headrest is moving towards the front direction).

Therefore, the contact position is close to the coil portion 724 in the position (backward direction) where the elastic deformation of the return spring 720 is small, while the contact position is far from the coil portion 724 in the position (forward direction) where the elastic deformation of the return spring 720 is large. Thus, the user convenience is enhanced since there is no significant difference in the forces being applied to the headrest by a user even the moving distance of the headrest is increased (that is, even it is moved forward to the end point). Further, there may be no significant difference in the operational force of the lever member 10 or the button even if the position of the headrest is being changed.

When moving the headrest backward, as illustrated in FIG. 23, if a user pushes the button (not shown) connected to the handle portion 12 of the lever member 10, or pushes the handle portion 12 (b) at any position, the lever member 10 is rotated counterclockwise and the stopping protrusion 170 is being pushed by the pressing portion 13, then the pole 100 is being rotated counterclockwise, thereby separating the pole 100 from the ratchet 200. Thus, the headrest can be moved to anywhere along the forward and backward direction. If a user removes the force applied to the button or the handle portion 12, the lever member is returned towards the clockwise direction by the lever return spring 15, thus the pressing portion 13 pressing the stopping protrusion 170 is returned to the original position thereby (c). Due to this operation the pole is being rotated clockwise and geared with the ratchet 200.

In this way, since after the consumer moves the headrest locking can be released by the operation of the button connected to the lever member 10 which is externally exposed from the headrest or the lever member 10 at any position thereof, the consumer can easily recognize how to release the locking. Thus, the consumer can effectively and easily utilize the headrest moving device, and at the same time the increase in manufacturing cost can be prevented. Furthermore, the operability is enhanced and the noise generation and degradation of durability can be minimized by maintaining the structure simple and minimizing the friction.

Meanwhile, when the pole 100 is geared to the ratchet 200, a plurality of widthwise teeth 150 and 240 are geared to a plurality of lengthwise teeth 150 and 240.

Due to this mechanism, even though any one of the widthwise teeth 150 and 240 is separated, other teeth in the same line of widthwise teeth 150 and 240 are in a geared state, therefore the geared state is stably maintained. Besides, in a geared state, even under the high load condition the durability can be maintained since a plurality of widthwise teeth 150 and 240 are simultaneously geared to a plurality of lengthwise teeth 150 and 240.

As described above, although the present invention has been described with reference to the preferred exemplary embodiments, various changes and alterations of the present invention can be made by those skilled in the art without departing from the spirit and the scope of the present invention written in the claims described herein below.

| Description of Symbols Description of major elements in drawings | |
|---|---|
| 100: pole | 200: ratchet |
| 300: first link | 400: second link |
| 500: third link | 600: fourth link |
| 710: spring | 720, 720': return spring |
| 730: stay rod | 900: first bracket |

The invention claimed is:

1. A headrest moving device comprising:

a moving unit, having one side connected to a headrest and a second side connected to a stay rod, for moving said headrest with respect to said stay rod, said moving unit comprising a first bracket being installed in said stay rod and a second bracket which is pivotally and rotatably installed in said stay rod and being connected to said headrest;

a locking unit for maintaining the position of said headrest after being moved thereto, said locking unit comprising a ratchet and a pole which is geared with said ratchet, wherein said pole is pivotally and rotatably installed in said first bracket, and said ratchet is installed in said second bracket, and a spring having two ends respectively connected to said first bracket and said pole so that the gearing between said pole and said ratchet is maintained; and a return spring, having one portion fixed to said stay rod and a second portion is in contact with said moving unit, for returning said moving unit, wherein the contact position is varied according to the position of said headrest.

2. The headrest moving device according to claim 1, wherein as the moving distance of said headrest increases, said contact position thereof moves further from the center of said return spring.

* * * * *